Aug. 17, 1937.  R. C. HOFFMAN  2,090,123
MOTOR VEHICLE
Filed Dec. 1, 1932   7 Sheets-Sheet 1

INVENTOR
Roscoe C. Hoffman
BY
Harness, Dickey, Pierce & Hann
ATTORNEYS.

Aug. 17, 1937.  R. C. HOFFMAN  2,090,123
MOTOR VEHICLE
Filed Dec. 1, 1932   7 Sheets-Sheet 6

INVENTOR
Roscoe C. Hoffman.
BY
Harness, Dickey, Pierce & Hann.
ATTORNEYS.

Patented Aug. 17, 1937

2,090,123

UNITED STATES PATENT OFFICE 2,090,123

MOTOR VEHICLE

Roscoe C. Hoffman, Detroit, Mich.

Application December 1, 1932, Serial No. 645,218

19 Claims. (Cl. 74—327)

This invention relates to motor vehicles and particularly to motor vehicles of the rear engine, rear drive type, the principal objects being the provision of a vehicle of this type of improved construction together with a power plant therefor of improved and simplified design.

An object of the invention is the provision of a rear engine rear drive motor vehicle so constructed and arranged as to permit a maximum amount of passenger carrying capacity with respect to the wheel base thereof.

Other objects are:—the provision of a power plant design for a rear engine, rear drive motor vehicle that permits of a minimum amount of space to be utilized therefor, thereby permitting a maximum amount of passenger carrying capacity to be realized in the body of the motor vehicle; to provide a power plant design for a rear engine, rear drive motor vehicle in which a minimum amount of changes in the parts of conventional types of motor vehicles is required in order to produce the same; to provide a power plant for rear engine, rear drive motor vehicles permitting ready assembly and disassembly of the various parts thereof; to provide a power plant for a rear engine, rear drive motor vehicle in which a maximum amount of accessibility to the various parts of the power plant is permitted; and to provide a power plant for a rear engine, rear drive vehicle of generally improved and simplified construction.

Other objects of the present invention are:— to provide a power plant for a rear engine, rear drive vehicle in which the power plant comprises a multi-cylinder internal combustion engine arranged with the axis of the crank shaft transversely with respect to the length of the motor vehicle, and having the transmission and final drive unit thereof formed as a unitary part of the power plant unit; to provide a power plant unit in which the transmission and final drive gear unit is arranged as a unitary part thereof at one lateral side thereof; to provide a power plant unit in which the transmission and final drive gear unit is arranged within the longitudinal confines of the power plant; to provide a power plant unit in which the transmission and final drive gear unit is arranged within the longitudinal confines of the engine and with their axes substantially parallel to the axis of the engine crank shaft; to provide a power plant of the type described having an improved means for maintaining the center distances between parts of the mechanism employed for transmitting the power from the engine crank shaft to the transmission shaft; to provide a power plant for a motor vehicle having a simple and advantageous construction permitting an overrunning of the axle shaft with respect to the crank shaft of the engine, and/or the provision of a two speed final drive mechanism therefor; to provide a power plant unit in which the speed change mechanism acts as a spacer between the engine drive gear housing and the axle reduction housing; to provide an internal combustion engine of the type having a single row of aligned or approximately aligned cylinders and so mounted that the plane of cylinder axes is normally disposed at an angle with respect to both the horizontal and vertical; to provide a driving unit having a novel means for taking the reactive load on the gearing connecting the crank shaft of the engine thereof with the transmission shaft of the transmission thereof; to provide a power plant for a motor vehicle including a plurality of aligned cylinders disposed with their axes in a plane transverse to the longitudinal axis of the vehicle and a transmission and final drive gear unit unitarily associated therewith on the forward side thereof; and generally to provide an internal combustion engine form and unit having various novel features of construction.

Other objects are:—to provide an axle structure of novel construction for motor vehicles; to provide an axle structure largely formed of sheet metal; and to provide a novel method of forming an axle structure.

Other objects are:—to provide a novel method of suspending a power plant unit in a motor vehicle; to provide a construction in which means are provided for resiliently mounting the motor unit in the frame of the motor vehicle and which cooperates directly or indirectly to modify the action of the primary means provided for transmitting the load of the vehicle to the driving wheels thereof; to provide a construction whereby movement of the wheels of the vehicle with respect to the frame thereof is modified in accordance with movement of the vehicle engine with respect to the frame; and generally to provide improved means and method of supporting a power plant unit in a motor vehicle.

The above being among the objects of the present invention, the same consists in certain novel features of construction and combinations of parts to be hereinafter described with reference to the accompanying drawings and then claimed, having the above and other objects in view;

In the accompanying drawings which show suitable embodiments of the present invention and in which like numerals refer to like parts throughout the several different views:

Fig. 8 is an enlarged fragmentary vertical sectional view taken on the line 8—8 of Fig. 4 illustrating the cam shaft drive for the motor unit and further bringing out the drive between the axle shaft and the wheels of the vehicle.

Figure 1:
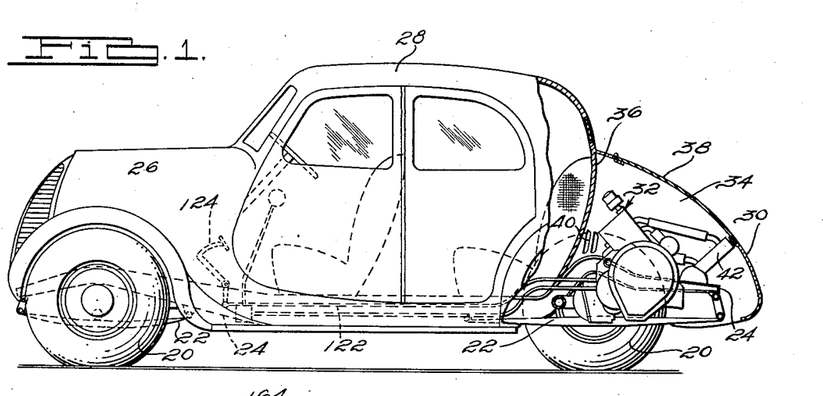
Figure 1 is a partially broken side elevational view of a motor vehicle.

Referring to the drawings and particularly to Fig. 1, a motor vehicle is shown therein including wheels 20 secured by springs 22 to a vehicle chassis frame 24 in a conventional manner. The frame 24 receives a vehicle body including a hood section 26, a passenger carrying compartment 28 and a tail or deck section 30, the latter adapted to enclose a driving unit including an engine, clutch, transmission and final drive mechanism, indicated in Fig. 1 generally as at 32. The engine compartment 34 under the rear deck 30 is preferably separated from the passenger carrying compartment 28 as by means of a wall 36, and the deck 30 is preferably provided with a hinged or removable lid 38 permitting ready access to the compartment 34. Air for engine cooling purposes may be drawn into the compartment 34 either upwardly through the space between the power plant unit 32 and the wall 36 or may be drawn in from the sides through suitable louvres 40 provided therein, the air passing around and/or over the engine and being discharged downwardly from the tail end of the compartment 34. Where the driving unit 32 is of the water cooled type a radiator such as 42 may be located between the engine and the rear wall of the deck 38, as indicated, in the path of air flowing out of the compartment 34.

Figure 3:
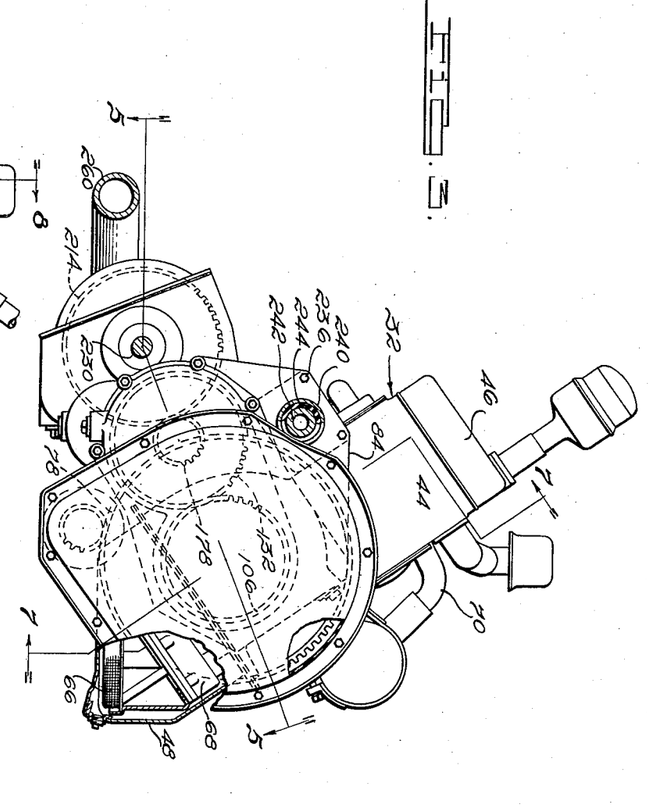
Fig. 3 is an enlarged end elevational view of the power plant unit employed in the motor vehicle illustrated in Fig. 1 and taken from the left hand side of the vehicle, viewed from the driver's seat.
Figure 7:
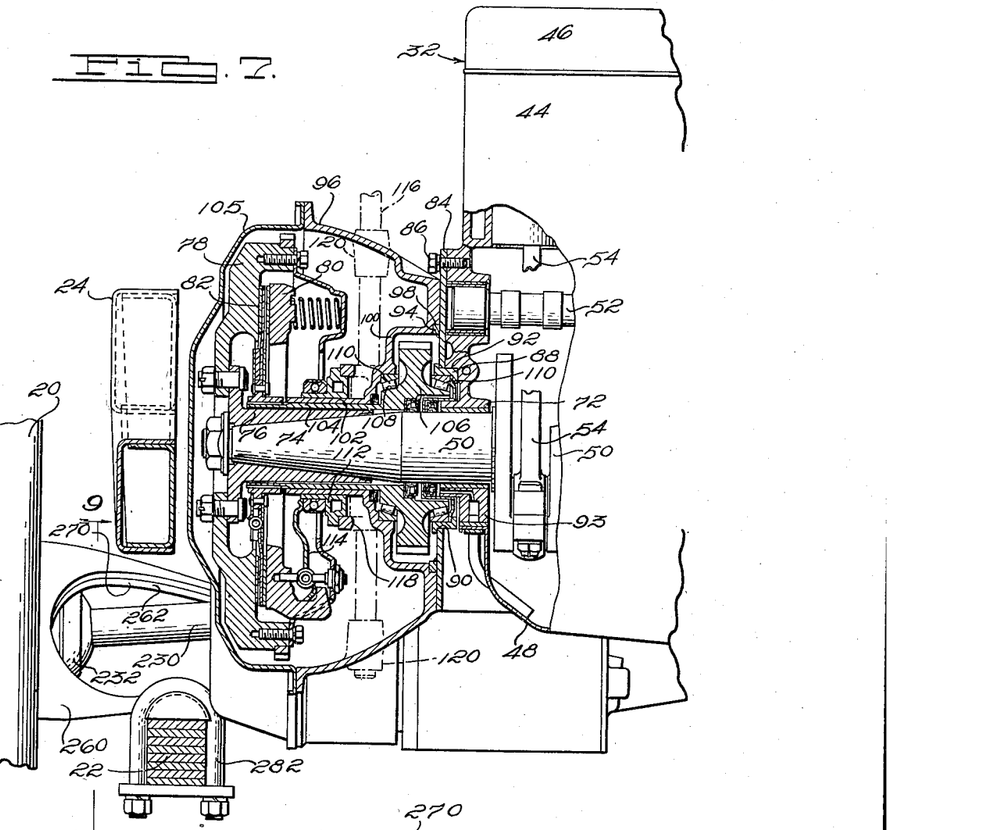
Fig. 7 is an enlarged fragmentary vertical sectional view taken on the line 7—7 of Fig. 3 and illustrating the drive from the engine through the clutch of the power plant unit.

The engine element of the driving unit 32 is of the multi-cylinder internal combustion engine type and, being of entirely conventional construction except as to certain features of the driving mechanism provided between it and the final gear reduction mechanism is concerned, is shown in outline only with exception of the partially broken view shown in Figs. 7 and 8 which indicate that it is provided with a combined cylinder block and crank case upper half 44, cylinder head 46, oil pan 48, crank shaft 50, cam shaft 52 and connecting rods 54. The crank shaft 50 is shown in Fig. 8, as being provided with a sprocket 56 and the cam shaft 52 with a sprocket 58 which may be connected together by means of a suitable belt chain (not shown). The sprockets 56 and 58 are provided with the usual housing 60 and the outwardly projecting end of the crank shaft 50 is shown as being provided with a vibration damper assembly 62 the driving member of which is formed to provide a pulley 64 for driving purposes in connection with an electric generator and/or cooling fan. The only other material modification of the engine structure itself is best illustrated in Fig. 3 in which it will be observed that, because of the tilting of the engine itself for reasons which will hereinafter be more fully pointed out, the oil pan 48 is somewhat modified so that the screened intake 66 for the oil pump 68 will be suitably located at the lowest elevation in the oil pan 48.

The engine, as illustrated in the various figures, is arranged within the compartment 34 with the axis of its crank shaft horizontally disposed and perpendicular to the longitudinal axis of the motor vehicle, and with the plane of the cylinder axes tipped forwardly about the axis of the engine crank shaft which, as illustrated best in Fig. 1, permits the rear face of the engine to be brought into approximate parallelism with the rear deck 30 and thus permits a shorter and smaller and, therefore, a more unobtrusive appearing deck or tail to be employed. This feature, particularly when employed in combination with the particular arrangement of driving parts, to be hereinafter more specifically described, and in which the crank shaft of the cylinder is rearwardly disposed relative to the axle shafts, permits a relatively greater proportion of body space to be employed for passenger carrying purposes as compared to similar constructions heretofore proposed and of a commensurate overall length. Furthermore, and particularly where the internal combustion engine is of the L-head type and the valve side of the engine is arranged to the rear, as indicated, for instance by the presence of the intake manifold 70 in Figs. 3 and 4, unusually ready access to those parts of the motor requiring the most attention from a service standpoint is realized.

Figures 5, 6:
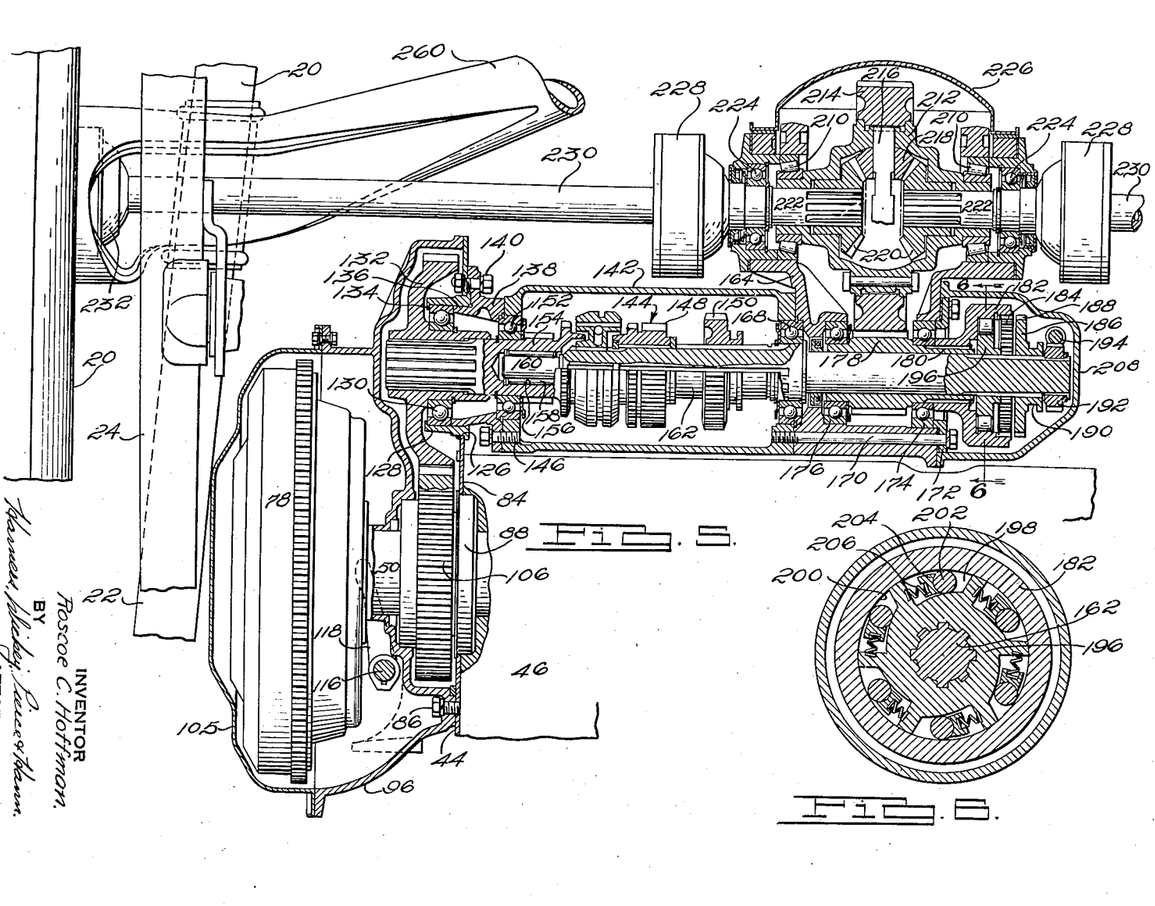
Fig. 5 is a partially broken and partially sectioned view taken in a horizontal plane centrally through the power transmission mechanism of the power plant unit disclosed in Figs. 3 and 4, as on the line 5—5 of Fig. 3 and illustrating the mechanism provided for transmitting the power from the engine to the driving axles of the vehicle.
Fig. 6 is an enlarged sectional view taken on the line 6—6 of Fig. 5 and disclosing the construction of the overrunning clutch employed in connection therewith.
Figure 5:
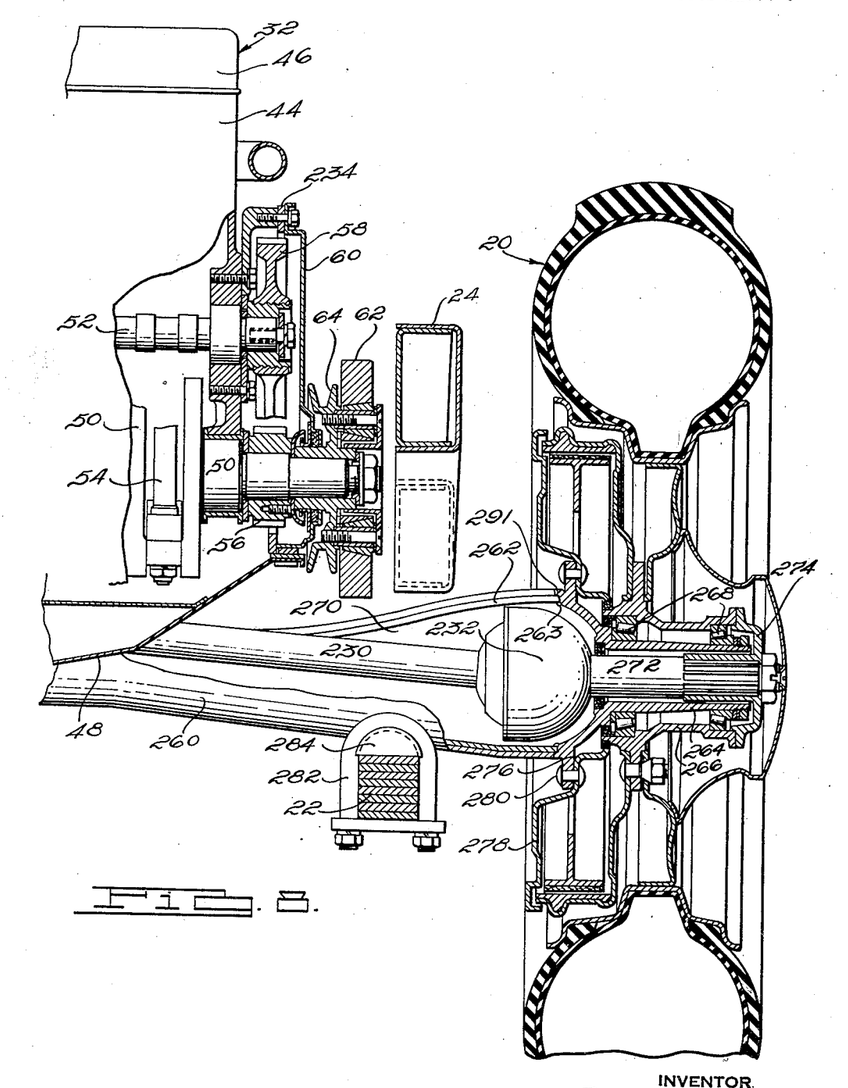

As best illustrated in Figs. 5 and 7, the end of the crank shaft 50 opposite to that shown in Fig. 8 is rotatably received by a plain bearing 72, formed in part integrally with the corresponding end wall of the cylinder block 44, and projects outwardly therebeyond where it terminates in a tapered portion 74 which serves to support, through the medium of a flanged hub 76, a flywheel 78 forming part of a clutch mechanism, including a conventional type of spring pressed pressure plate 80 and driving element 82.

The corresponding end of the cylinder block 44 is closed by a flat metal plate member 84 secured thereto by means of cap screws 86. The plate 84 is definitely and accurately located relative to the axis of the crank shaft 50 by means of an annular bearing support 88 piloted within the central opening 90 in the plate 84 and in turn piloted within the recess 92 formed in the corresponding end wall of the cylinder block concentric with the bearing 72. The lower half of the support 88 is piloted in an extension of the recess 92 formed in the end wall of the bearing cap 93.

The plate 84 on its outer surface is provided with an outwardly projecting ring 94, suitably fixed thereto as by welding, and the outer surface of which is located in true concentric relation with respect to the axis of the crank shaft 50. A clutch housing member 96 of cast construction and of generally cup-shaped conformation is provided in the bottom end thereof with a circular recess 98 which is piloted over the ring 94 and which thus definitely locates the housing 96 centrally with respect to the axis of the crank shaft 50. The clutch housing member 96 is secured to the end of the engine by a portion of the same screws 86 which secure the plate 84 thereto, as illustrated in Fig. 5. The bottom end of the cup-shaped housing member 96 within the recess 98 is inwardly recessed as at 100 to form a chamber and centrally thereof is provided with an axially outwardly projecting sleeve-like portion 102.

The hub portion of the clutch driven member 82 is splined to the end of a sleeve 104 which has bearings on the outer surface of the hub member 76. This end of the clutch mechanism is enclosed by a cup-shaped sheet metal housing member 105 secured at its rim to the rim of the member 96. The opposite end of the sleeve member 104 is formed to provide a gear 106 located within the chamber 100. Concentricity of the gear 106 with the crank shaft 50 is insured by providing bevel shoulder portions 108 at opposite ends thereof to serve as the inner race of bearing assembly 110 therefor. The outer race of the outer bearing assembly 110 is received in a suitable recess formed in the outer wall of the chamber 100 while the outer race of the inner bearing 110 is received within the annular bearing support 88 previously described. By the aforementioned means concentricity of the gear 106 with the crank shaft 50 is positively assured. From the above it will be observed that the gear 106 is releasably secured to the crank shaft 50 through the medium of the above described clutch, and is positively and amply supported in concentric relation with respect to the crank shaft.

Control of the clutch illustrated in Fig. 7 is accomplished through employment of a conventional type of clutch throw out collar 112 axially slidable upon the sleeve 102, clutch throw out arms 114, clutch throw out shaft 116 and yoke member 118 fixed thereto. All these last mentioned parts may be of any conventional construction and need not be described in detail here. The clutch shaft 116 has bearings in suitable bosses 120 formed integrally with the clutch housing member 96 and, as illustrated, is preferably positioned with its axis vertically arranged so that its rotatable position may be more easily and simply controlled through connections such as 122 (see Fig. 1) extending to a clutch pedal such as 124 suitably positioned within the passenger compartment 28 for operation by the driver of the vehicle.

In accordance with the present invention the transmission and final drive unit is positioned adjacent the front side face of the engine, and power from the engine is transmitted thereto through the gear 106. In order to effect a drive between the transmission and the gear 106, the plate 84 is extended forwardly beyond the corresponding side face of the engine and beyond such side face is provided, as best indicated in Fig. 5, with an opening 126 in which is closely received, and preferably fixed thereto as by welding, a tubular bearing support 128 which serves to support a roller bearing assembly 130. The bearing assembly 130 in turn receives therein the hub of a gear 132 which meshes with the gear 106. The bearing assembly 130 is maintained against axial movement by being clamped between the inturned flange 134 formed on the left hand end of the support 128, as viewed in Fig. 5, and the tubular pilot 136 formed on the spacer bracket 138 secured to the right hand face of the plate 84 by means of bolts 140. The casing 142 of a transmission mechanism indicated generally at 144 is secured at its left hand end by cap screws such as 146 to the right hand end of the spacer bracket 138. The transmission mechanism 144 may be made in substantial accordance with any conventional transmission mechanism now being employed in motor vehicles and consequently is not shown in full detail, it being understood that it includes the usual counter-shaft and counter-shaft gears (not shown) adapted for engagement with the gears 148 and 150.

A ball bearing assembly 152 is secured between the left hand end of the transmission casing 142 and the spacer bracket 138 in concentric relation with the bearing assembly 130. The stub shaft 154 is received within the bearing assembly 152 and its left hand end is splined for reception within the splined bore of the gear 132. The right hand end of the bore of the gear 132 is not splined and is adapted to closely receive the corresponding portion of the stub shaft 154 so as to aid, in conjunction with the bearing 152, to provide an outboard bearing for the gear 132. It might be noted at this point that the bearing assembly 130 is located substantially centrally of the width of the face of the gear 132, thus permitting it to take the torque from the gear 106 without being subject to a tendency toward deflection from its true position.

Again referring to Fig. 5, it will be noted that the right hand end of the stub shaft 154 is recessed concentrically with respect to its axis as at 156, and rotatably received therein with the aid of needle bearings 158 is the pilot portion 160 of the main transmission shaft 162. At the right hand end of the transmission casing 142 a final drive housing 164 is rigidly secured to the front side of the cylinder block by means of bolts 166 (see Fig. 4) and the left hand end of the main transmission shaft 162 projects through and beyond the same. A ball bearing assembly 168 is clamped between the right hand end of the transmission casing 142 and the differential casing 164 to serve to support the main transmission shaft 162 at this point. Bolts 170 extending through the width of the rear portion of the final drive housing 164 and threading into the transmission casing 142 serve to secure the right hand end of the transmission casing to the differential housing and, at the same time, serve to secure the locating ring 172 of the bearing assembly 174 in place within the final drive housing 164.

A second bearing assembly 176 suitably supported within the final drive housing 164 in spaced and concentric relation with respect to the bearing assembly 174 serves, together with the bearing assembly 174, to rotatably receive the opposite ends of a pinion gear 178 rotatably surrounding the extended end of the main transmission shaft 162. The right hand end of the pinion gear 178, as viewed in Fig. 5, is extended as at 180 to a position beyond the corresponding side face of the final drive housing 164 and is there splined to the hub of a dog or dental clutch member 182 having internal teeth 184 formed in its outer end. The corresponding end portion of the main transmission shaft 162 is also splined and non-rotatably but slidably received thereon is the other member 186 of the dental clutch having teeth 188 formed on its periphery for selective engagement with the teeth 184. The hub of the clutch member 186 is peripherally grooved as at 190 for engagement with the fork of a suitable shifting lever (not shown). The extreme right hand end of the main transmission shaft 162, as viewed in Fig. 5, may be provided with a gear member 192 adapted to mesh with a second gear 194 suitably connected in a conventional manner to a speedometer in accordance with conventional practice.

It will be observed that if the clutch member 186 is shifted to the left as viewed in Fig. 5 to bring the teeth 188 into mesh with the teeth 184, the main transmission shaft 162 will be positively locked to the pinion gear 178 for equal movement therewith but that when the clutch member 186 is in the position indicated in Fig. 5 no such positive engagement is provided. The purpose of such construction is to permit the employment of a so-called "free wheeling" clutch between the main transmission shaft 162 and the pinion gear 178. In the particular illustration shown, this free wheeling clutch takes the form of a driving member 196 splined on the right hand end of the main transmission shaft 162 within the clutch member 182. The periphery of the member 196, as illustrated in Fig. 6, is recessed as at 198, the bottoms of the recesses being formed spirally with respect to the axis of the shaft 162. The clutch member 182 is formed to provide a circular track 200 about the periphery of the member 196 and received between the bottom of each recess 198 and the track 200 is a roller 202 constantly urged towards the shallow end of the recess by means of a follower 204 constantly urged in that direction by means of a spring 206. As is well known to those skilled in the art, such a construction when the shaft 162 is turned in a counter-clockwise direction, as viewed in Fig. 6, will cause the roller 202 to be wedged between the bottoms of corresponding recesses 198 and the circular track 200, and, accordingly, will lock the member 182 to the member 196 for equal rotation therewith. When, however, the member 182 attempts to overrun the member 196 when turning in the above described direction, the rollers 202 will tend to roll towards the deep end of their corresponding recesses 198 and will permit the member 182 to run free of, or overrun the member 196.

Accordingly, with this mechanism as in conventional constructions, when the free wheeling clutch just described is effective, if the engine tends to rotate faster than the corresponding speed of rotation of the wheels the free wheeling clutch is effective to transmit torque from the engine to the wheels, but if the wheels tend to overrun the corresponding speed of the engine, then the free wheeling clutch is effective to permit such overrunning. Obviously, an additional gear reduction may be inserted with, or in place of the free wheeling clutch indicated. It may also be noted at this point that a suitable bell housing 208 is sealed to the final drive housing 164 over the mechanism just described. Another feature that it is desired to call attention to at this time is the fact that the transmission casing 142 is preferably entirely free of contact with the forward face of the crank case 44 and with the spacer bracket 138 serves as a spacer between the final drive housing 164 and the plate 84. This method of forming the transmission casing 142 serves to simplify the construction and aids in ease of production.

Forwardly of the main transmission shaft 162 the final drive housing 164 is provided with a pair of spaced roller bearing assemblies 210 which rotatably receive between them the extended tubular ends of the differential housing 212 to the periphery of which is suitably secured a ring gear 214 which lies in mesh with the pinion gear 178. The differential housing 212 is interiorly provided with the usual spider 216 which supports the differential pinions 218 which lie in mesh with the differential side gears 220 in accordance with conventional practice. The hubs of the side gears 220 have suitable bearings within the differential housing 212 and are internally splined for engagement with the splined ends of the stub-shafts 222 which project outwardly from each end thereof and each of which has an additional bearing 224 outwardly of the corresponding roller bearing 210. The forward end of the differential housing 164 is enclosed by an oil tight sheet metal housing member 226 suitably secured thereto in a conventional manner.

Each of the stub shafts 222 immediately outwardly of the housing 164 is secured to a universal joint 228. Each universal joint 228 has secured thereto the inner end of an outwardly extending axle shaft 230, the outer end of each of which is provided with a second universal joint 232 adjacent its point of connection with its corresponding rear wheel 20.

From the foregoing it will be apparent that in the above described mechanism power from the engine crank shaft 50 is transmitted through the clutch mechanism back to the gear 106 where it is transferred through the gear 132 to the transmission mechanism and from the transmission mechanism to a free wheeling device, if desired, and thence through the pinion gear 178 and ring gear 214 to the differential mechanism and thence through the universal joints 228, drive shafts 230 and universal joints 232 to the driving wheels of the vehicle.

Figures 2, 10:
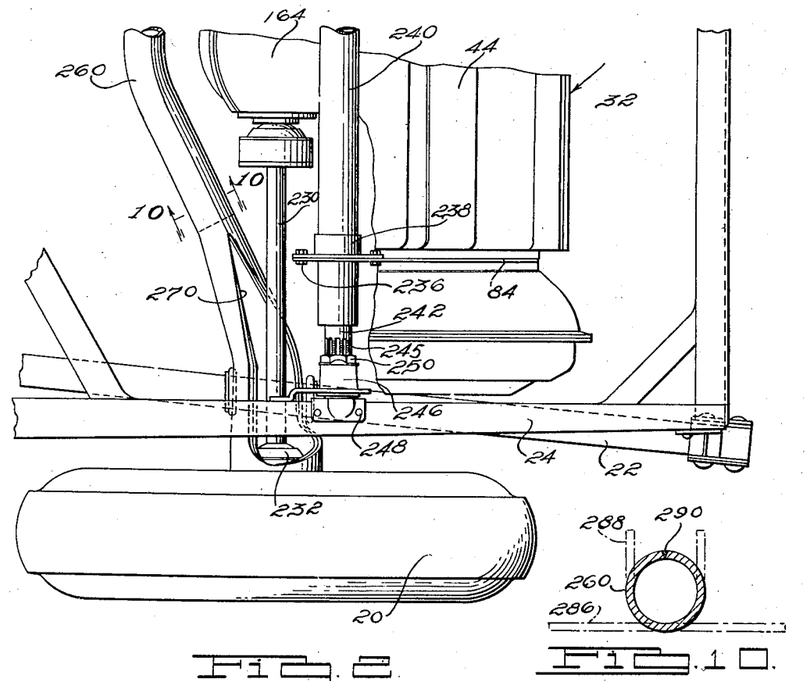
Fig. 2 is an enlarged, fragmentary plan view of a portion of the rear corner of the chassis of the vehicle shown in Fig. 1.
Fig. 10 (Sheet 1) is a transverse sectional view taken through the rear axle as on the line 10—10 of Fig. 2 and illustrating by the use of dotted lines the method employed in forming the central portion of the axle.
Figure 4:
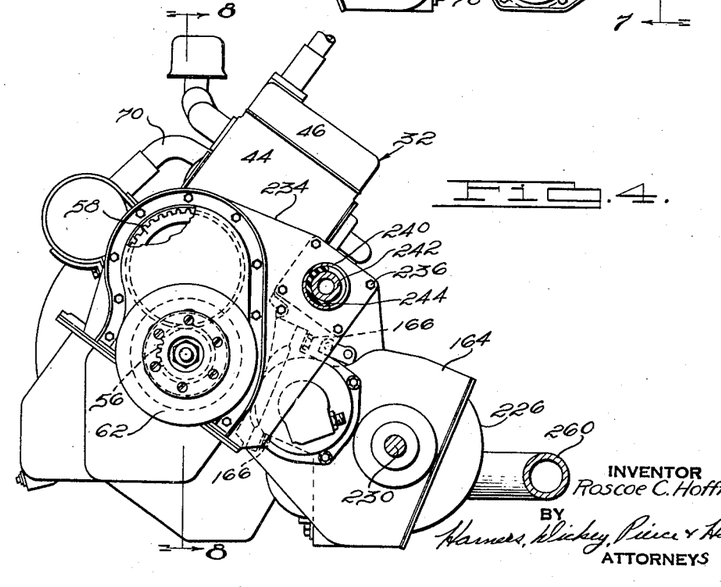
Fig. 4 is a partially broken and elevational view of the power plant unit shown in Fig. 3, but looking from the opposite end thereof.

As best illustrated in Figs. 2, 3 and 4, the entire driving unit including the engine, clutch, transmission and differential mechanisms, is mounted in the chassis frame in a novel manner and although, as far as the broad aspect of this engine mounting is concerned, the invention involved therein forms the subject-matter of a separate patent application, it will be described in detail here particularly in view of certain specific applications of the same forming a part of the present invention. Referring now to the above mentioned figures, it will be noted that the upper portion of the plate 84 projects forwardly into the angle formed between the cylinder block 44 and the transmission housing 142 and final drive unit housing 164. As best illustrated in Fig. 8, a plate member 234 secured to the right hand end of the engine immediately inwardly of the chain housing cover plate 60 also projects forwardly into the angle formed between the cylinder block 44 and final drive housing 164. In each of these projecting portions of the plates 84 and 234 is rigidly secured as by means of bolts 236 a bracket 238, and projecting between the brackets 238 and beyond each of them and fixed relative thereto is a tube 240. A shaft 242 positioned within the tube 240 and in generally spaced relation with respect to the interior wall thereof projects through the entire length of the tube 240 and beyond the end thereof. The space between the shaft 242 and the tube 240 is filled with rubber as at 244 which is preferably vulcanized to the opposed faces of each member thereby resiliently connecting them together. The outer ends of the shaft 242 are splined as at 245 and are non-rotatably received in two-part brackets 246, one part of which is secured to the corresponding side frame members of the frame 24 as by means of rivets 248, and the other or inner part of which is axially slidable relative thereto. Nuts 250 threaded on the splined ends 245 cooperate with the inner part of each bracket 246 to hold such part in place and to control the axial position of the shaft 242 and consequently the driving unit 32 with respect to the fame 24. Upon backing off the nuts 250 the corresponding inner bracket parts may be shifted in that direction until the bracket parts are disengaged and then the driving unit 32 moved bodily out of engagement with the frame. This bracket mechanism forms part of the subject matter of my copending application for Letters Patent of the United States for improvements in motor vehicles, filed on even date herewith and serially numbered 645,219, and reference to such application will more clearly illustrate this phase of the construction.

By tipping the engine unit, as previously described, forwardly about the axis of the crank shaft, and by locating the transmission and final drive unit forwardly of the engine crank case, and by positioning the supporting shaft 242 as far rearwardly as is possible in the angle between the cylinder block 44 and the final drive unit, it is possible to locate the shaft 242 close to the center of mass of the driving unit 32 and, due to the fact that the rubber 244 resiliently connects the tube 240 with the shaft 242, the driving unit is floated upon the rubber 244 for oscillatory movement about the axis of the shaft 242. This permits a limited oscillation of the driving unit 32 about the axis of the shaft 242 to compensate for variations in the torque being transmitted between the engine and the driving wheels, and also serves to absorb engine vibrations and insulate them from transmission to the frame 24. Furthermore, in view of the fact that the engine is disposed with its crank shaft perpendicular to the longitudinal axis of the motor vehicle and the support is positioned in approximately parallel relation with respect to the axis of the crank shaft, any vibratory movement of the engine about the axis of the shaft 242 will be apparent to a considerably less degree if at all in the frame 24 than would be the case were the axis of the engine crank shaft and of the supporting tube 242 located in parallelism with the longitudinal axis of the motor vehicle.

Referring now to the axle construction, it will be noted, as perhaps best shown in Figs. 1 and 2, that the rear axle 260 is a dead type of axle, is located in the same horizontal plane as the final drive unit housing 164 and its central portion is bowed forwardly relative to the ends in order to clear the final drive casing 164. The central portion of the axle 260, which is preferably formed from sheet or plate metal into tubular formation, is enlarged in diameter at its ends and each enlarged end closely receives therein a complemental tubular reinforcing member 262, see Fig. 8, which is welded as at 263 to the abutting end of the corresponding tubular wheel spindle member 264. The hub 266 of the corresponding wheel 20 is rotatably mounted by means of roller bearings such as 268 upon each spindle 264. The enlarged outer end portions of the axle 260 are each provided with a triangular shaped opening 270 therein and, as best illustrated in Figs. 2 and 5, the corresponding axle shaft section 230 projects into the corresponding hollow outer end of the axle 260 through the corresponding opening 270, and the enlarged outer ends of the axle 260 are of a sufficient internal diameter to receive therein the corresponding universal joint 232.

As illustrated in Fig. 8, each universal joint 232 is provided with an outwardly extending stub shaft 272 which is non-rotatably secured to the outer end of the corresponding hub 266 by means of a cap member 274 splined to the outer end of the corresponding stub shaft 272. As also illustrated in Fig. 8, each spindle member 264 is provided with a radially outwardly extending flange 276 to which the backing plate member 278 of any conventional type of braking mechanism may be secured as by means of rivets 280. As perhaps best illustrated in Figs. 5 and 8, each rear spring 22 which is shown as of the semi-elliptical type, is connected to the corresponding end of the axle 260 by means of U-bolts such as 282 which cooperate with spring pad members 284 suitably welded or otherwise fixed to the axle 260.

Figure 9:
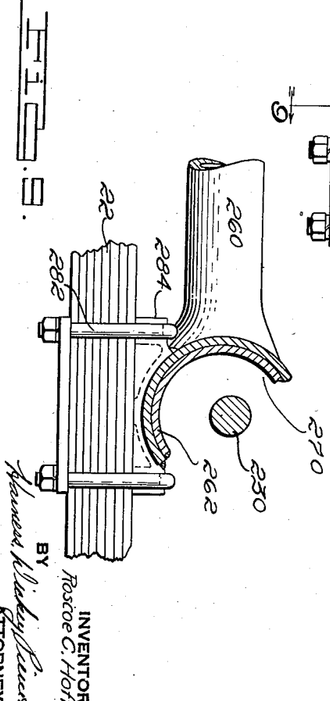
Fig. 9 is a transverse sectional view taken through one of the axles as on the line 9—9 of Fig. 7.

As best illustrated in Fig. 10, the main portion of the axle 260 is preferably formed from a flat strip of sheet metal such as is illustrated in dotted lines at 286, by first being bent into a U shape as at 288, and then the free edges of the sheet brought together and welded as at 290. During this operation the outer extremities of the axle 260 are formed to space their free edges apart to form the openings 270. Now referring to Figs. 8 and 9, it will be noted that the reinforcing member 264 has a portion thereof cut away in conformance with the size of the opening 270 in the axle 260, and the number 262 preferably projects into the corresponding end of the central portion of the axle 260 a distance at least as far as the inner end of the corresponding opening 270, and the free edges of the member 262 forming its portion of the corresponding opening 270 is preferably welded to the mating edges of the sheet metal portion of the axle 260. The line of junction between the extreme end portion of the sheet metal portion of the axle 260 is also preferably welded to the spindle member 264 as at 291. The above constitutes an economical method of forming a strong and efficient axle structure. It may be noted that the forward curvature of the central portion of the axle may be effected either during the forming thereof from the flat sheet, or after the tubular structure is completed, the latter being preferable.

With the above described axle structure it will be apparent that upon disconnecting the supporting shaft 242 from the brackets 246 in the manner previously described, and by removing the caps 274 from the stub shafts 272, the entire final drive mechanism, including the engine, clutch, transmission, final drive gear unit, drive shafts 230 and universal joints 232, may be lifted as a unit free and clear from the chassis of the vehicle where it may be readily and easily operated upon. Obviously, this mechanism may be initially assembled in this manner, during the manufacture of a vehicle, and applied to the vehicle by reversing the above operations.

Figure 12:
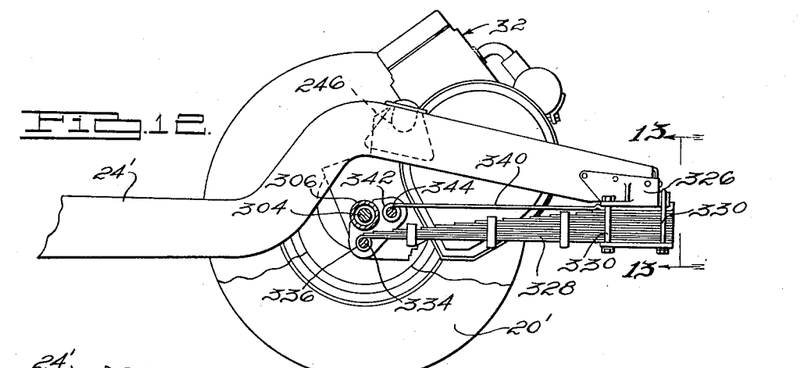
Fig. 12 is a side elevational view of the parts shown in Fig. 11.
Figure 13:
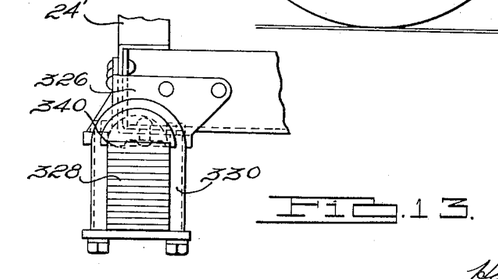
Fig. 13 is an enlarged fragmentary view taken as on the line 13—13 of Fig. 12 and disclosing an end view of the connection between the vehicle frame and the suspension spring.
Figures 14, 15:
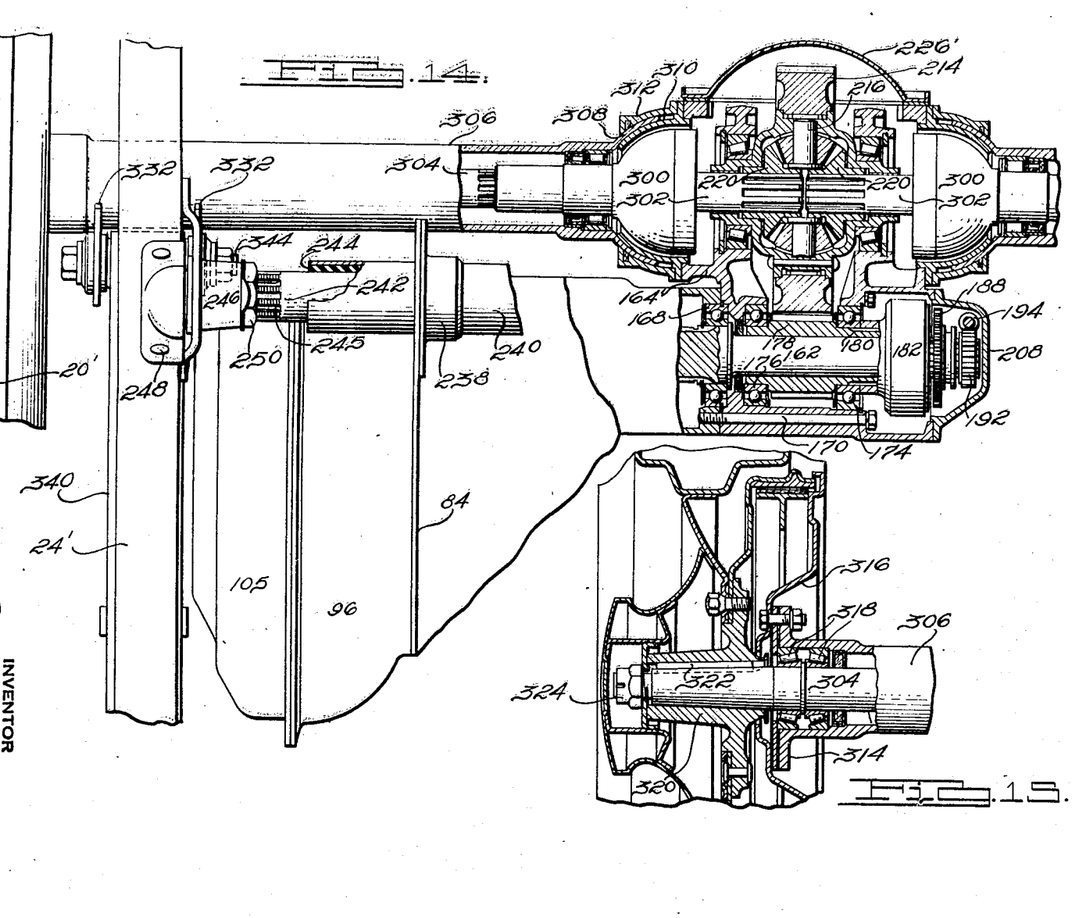
Fig. 14 is a view somewhat similar to Fig. 5 but showing the modified form of construction illustrated in Figs. 11 and 12.
Fig. 15 is a fragmentary horizontal sectional view taken centrally through the axle of the mechanism shown in Fig. 14 and illustrating the construction at the outer end of the axle structure shown in Fig. 14.

Referring now to Figs. 11 to 15 inclusive, a modification of the previously described construction is illustrated. This modification deals mainly with the spring suspension at the rear end of the vehicle and in this modified construction the previously described mounting of the final drive unit affects such spring suspension. As indicated in Fig. 14, the final drive unit including the engine, clutch, transmission and drive to the differential mechanism is identical to that previously described, the whole unit being supported through the medium of the tube 240 and telescoped shaft 244 connected thereto by rubber as in the previously described construction.

In this particular construction the formation of the final drive housing 164' is slightly different from that previously described in order to accommodate at each end thereof universal joints 300 connected to the differential side gears 220 by means of stub shafts 302. In the present case each of the axle shafts 304 which are connected to their corresponding universal joint 300 is enclosed in a tubular axle housing member 306 the inner end of which is formed into a partially spherical shape as at 308 and is secured for universal movement, but against axial movement, with respect to the final drive housing 164' by means of the cooperating inner and outer partially spherical members 310 and 312 suitably secured to the side face of the final drive housing 164. As indicated in Fig. 15, in this modification no universal joints such as 232 in the previously described construction are employed adjacent the wheels, but instead each tubular housing member 306 is flanged at its outer end as at 314 and has secured thereto the backing plate 316 of a suitable type of brake mechanism. The outer end of each tubular housing 306 is provided internally thereof with a pair of bearing assemblies 318 which serve to rotatably support the outer end of the corresponding shaft 304 to which the hub 320 of the corresponding wheel is locked as by means of a key 322 and nut 324.

Figure 11:
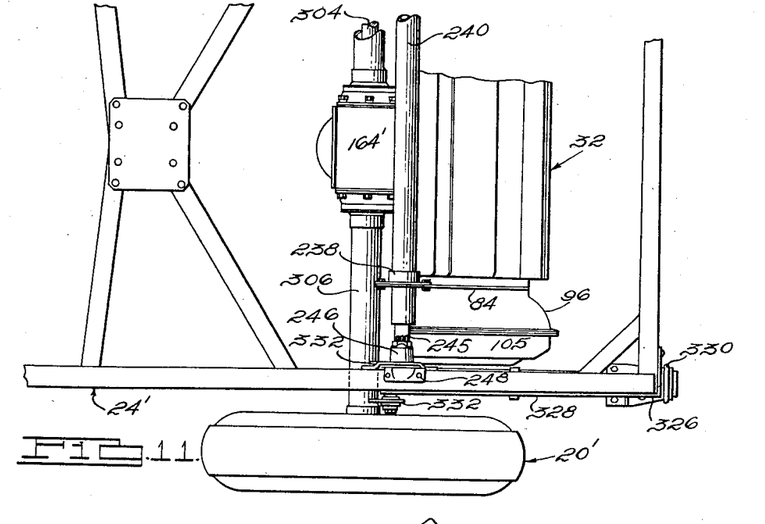
Fig. 11 is a view similar to Fig. 2 and illustrating a modified form of drive between the final reduction gearing and the wheel and modified form of suspension means between the vehicle frame and the wheels.

Now referring to Figs. 11, 12 and 13, it will be noted that the rear end of each side member of the frame 24' is provided with a bracket 326, and to the lower face of each of which is secured the forwardly extending quarter-elliptic leaf spring 328, as by means of U-bolts 330. As perhaps best indicated in Figs. 12 and 14, each tubular axle housing member 306 is provided adjacent its outer end with a pair of spaced parallel plate members 332 suitably fixed thereto as by welding, and a bolt 334 extending between the lower ends of the plate 332 is rotatably received in the corresponding eye 336 formed on the forward end of the corresponding spring 328. A single leaf spring 340 is clamped by the U-bolts 330 between each spring 328 and its corresponding bracket 326 and its forward end is formed to provide an eye 342 which is journaled on a bolt 344 extending between the corresponding members 332 at a point spaced upwardly from the corresponding bolt 334. The single leaf spring 340 serves more or less as a radius rod which, in conjunction with the corresponding spring 328, takes the driving and braking torque on the rear axle structure and prevents rotation thereof.

With this modified structure, it will be apparent that the point of contact of the wheels 20' with the road surface are spaced outwardly, relative to the longitudinal axis of the vehicle with respect to the points of application of the springs 328 to the axle housing members 306. As a result of this relation of these parts, the upward reaction on the wheels 20' and the downward reaction of the vehicle weight transmitted through the springs 328 to the tubular axle members 306 tends to move the inner ends of the members 306 downwardly or towards the road surface. This tendency towards downward movement of the inner ends of the tubes 306 tends to rock the final drive unit 32 in a counter-clockwise direction as viewed in Fig. 12, about the supporting shaft 244 as an axis, and this tendency is resisted by distortion of the rubber interposed between the tube 240 and the shaft 244. In addition it is to be noted that any such movement of the final drive unit 32 about the shaft 244 as a result of road shock or other forces transmitted to the rear axle structure is also resisted by the force necessary to move the mass of the final drive unit 32 about its pivotal axis on the shaft 244. Consequently, with this construction, the action of the springs 328 is modified not only by the resistance to deformation or by the rubber between the shaft 244 and on the tube 240 but also by the force necessary to move the mass of the final drive unit 32 about the axis of the shaft 244. Such an arrangement offers many possibilities towards beneficial control of the spring action and riding qualities of the vehicle.

While only two modifications of the present invention have been shown and described in the foregoing specification, it will be apparent to those skilled in the art that the broad invention involved is capable of a wide variety of changes and modifications, and accordingly it will be apparent that formal changes may be made in the specific embodiments of the invention disclosed without departing from the spirit or substance of the broad invention, the scope of which is commensurate with the appended claims.

I claim:

1. In a driving mechanism, an engine having a crank-case, the crankshaft of said engine projecting through one end of said crankcase, a gear surrounding the projecting end of said crankshaft, means fixed with respect to said crankcase rotatably supporting said gear independently of said crankshaft and manually controllable means for releasably clutching said gear to said crankshaft for driving movement therefrom including clutch driving member secured to said crankshaft, a clutch driven member, and means concentric with said crankshaft connecting said gear and said clutch driven member.

2. In a driving mechanism, an engine having a crankcase and a crankshaft projecting from one end thereof, clutching means on the projecting end of said crankshaft, a housing enclosing said clutching means and fixed with respect to said crankcase, a gear surrounding said projecting end of said crankshaft and rotatable relative thereto, means carried by said housing and said crankcase respectively, for rotatively supporting said gear independently of said crankshaft, and a connection between said gear and said clutching means.

3. In a driving mechanism, an internal combustion engine having a crankcase and a crankshaft, a plate member closing one end of said crankcase and fixed thereto, said crankshaft projecting out through said plate, a clutch housing fixed to said plate, a clutch within said housing connected to said crankshaft, a gear surrounding said crankshaft and rotatable relative thereto, bearings supported by said plate and housing rotatably supporting said gear, and means connecting said gear and clutch.

4. In a driving mechanism, an internal combustion engine having a crankcase and a crankshaft, a plate member closing one end of said crankcase and fixed thereto, said crankshaft projecting out through said plate, a clutch housing fixed to said plate, a clutch within said housing connected to said crankshaft, said housing being formed to provide a pocket between it and said plate and separated from said clutch, a gear rotatably mounted in said pocket for movement relative to said crankshaft, and means connecting said gear and clutch.

5. In a driving mechanism, an internal combustion engine having a crankcase and a crankshaft, a plate member closing one end of said crankcase and fixed thereto, means piloting said plate on said crankcase, said crankshaft projecting out through said plate, a clutch housing fixed to said plate, means piloting said housing on said plate, a clutch within said housing connected to said crankshaft, a gear surrounding said crankshaft and rotatable relative thereto, bearings supported by said plate and housing rotatably supporting said gear, and means connecting said gear and clutch.

6. In a driving mechanism, in combination, an engine having a crankcase and a crankshaft, a plate fixed to an end of said crankcase, a gear rotatably surrounding said crankshaft and rotatably supported at least in part by said plate independently of said crankshaft, means for connecting said gear and crankshaft, and a second gear supported at least in part by said plate and lying in mesh with the first mentioned gear.

7. In a driving mechanism, in combination, an engine having a crankcase and a crankshaft, a plate fixed to an end of said crankcase, said plate having a pair of openings therein, bearings secured in said openings, a gear rotatably supported by one of said bearings in concentric relation with respect to said crankshaft and independently thereof, means for connecting said gear and said crankshaft, and a second gear rotatably supported by the other of said bearings, said gears lying in meshing relationship.

8. In a driving mechanism, in combination, a multi-cylinder engine having a crankcase part common to all of said cylinders, a plate piloted on one end of said crankcase and fixed thereto, said engine having a crankshaft projecting through said plate, a gear rotatably supported at least in part by said plate, and means for releasably clutching said gear to said crankshaft.

9. In a driving mechanism, in combination, an engine having a crankcase and a crankshaft projecting therefrom, a plate fixed to an end of said crankcase, a gear rotatably surrounding the projecting end of said crankshaft and rotatably supported at least in part by said plate, a second gear in mesh with the first mentioned gear, and a supporting bearing for said second gear supported from said plate and lying at least in part within the face width of said second gear.

10. In a driving mechanism, in combination, an engine having a crankcase and a crankshaft projecting therefrom, a plate fixed to an end of said crankcase, a gear surrounding the projecting end of said crankshaft and rotatable relative thereto, a second gear in mesh with the first mentioned gear, a supporting bearing for said second gear supported from said plate and lying at least in part within the face width of the first mentioned gear, a driven shaft secured to said second gear and projecting therefrom, and a bearing for said driven shaft axially spaced from said second gear whereby to provide an outboard bearing for said second gear.

11. In a drive mechanism, in combination, an engine having a crankcase and a crankshaft, a transmission mechanism including a driven shaft mounted on a lateral side wall of said engine, means for driving said transmission from said engine, a final drive pinion gear supported by engine supported structure in concentric relation with respect to said driven shaft and adapted to be driven therefrom, said driven shaft projecting through said gear and being rotatable relative thereto, means for supporting said final drive gear independently of said driven shaft selectively operable means for connecting said driven shaft and gear for equal rotation, and a final axle driving mechanism driven from said gear.

12. In a drive mechanism, in combination, an engine having a crankcase and a crankshaft, a transmission mechanism including a driven shaft mounted on a lateral side wall of said engine, means for driving said transmission from said engine, a final drive pinion gear supported by said engine in concentric relation with respect to said driven shaft and adapted to be driven therefrom, said driven shaft projecting through said gear and being rotatable relative thereto, a one-way clutch mounted on the opposite side of said gear from said transmission, said clutch connecting said driven shaft and gear, and a final axle driving mechanism driven from said gear.

13. In a drive mechanism, in combination, an engine having a crankcase and a crankshaft, a transmission mechanism including a driven shaft mounted on a lateral side wall of said engine, means for driving said transmission from said engine, a final drive pinion gear supported by said engine independently of said driven shaft in concentric relation with respect thereto and adapted to be driven therefrom, said driven shaft projecting through said gear and being rotatable relative thereto, a one way clutch connecting said driven shaft and gear, a two-way clutch operable to lock said gear and driven shaft together for equal rotation, and a final axle driving mechanism driven from said gear.

14. In combination, an internal combustion engine having a crankcase and a crankshaft, a housing secured to a lateral face of said crankcase, a gear rotatably supported by said housing, a differential mechanism supported by said housing, a gear for driving said differential mechanism supported by said housing in mesh with the first mentioned gear, a support projecting laterally beyond said crankcase in spaced relation with respect to said housing, a third gear rotatably carried by said support, means for driving said third gear from said crankshaft, a transmission mechanism connecting said third gear with the first mentioned gear, and a housing for said transmission mechanism supported independently of said crankcase between said support and the first mentioned housing.

15. In a driving mechanism, in combination, an engine having a crankcase, a plate member secured to an end of said crankcase and disposed generally in a plane extending transversely of the longitudinal axis of said crankcase, a crankshaft within said crankcase projecting through said plate member, a clutch housing secured relative to said plate member and having its open side closed thereby, a clutch within said housing operatively associated with said crankshaft, a gear element surrounding said crankshaft between said clutch and plate member and rotatable relative to said crankshaft, and means operatively connecting said clutch and gear element.

16. In a driving mechanism, in combination, an engine having a crankcase and a crankshaft, a plate fixed to an end of said crankcase, a gear surrounding said crankshaft and rotatable relative thereto, releasable means for securing said gear in driving relation with respect to said crankshaft, and a second gear supported at least in part by said plate and lying in mesh with the first mentioned gear.

17. In a drive mechanism, in combination, an engine having a crankcase and a crankshaft, a transmission mechanism including a driven shaft secured in parallelism to a lateral side wall of said engine, a plate secured to a longitudinal end surface of said engine, said crankshaft projecting through said plate, a gear surrounding said crankshaft and rotatable relative thereto, releasable means for securing said gear and crankshaft together for equal rotation, said driven shaft projecting through said plate, and a gear secured to said driven shaft in driven relation with respect to the first mentioned gear.

18. In combination, an internal combustion engine having a crankcase and a crankshaft, a housing secured to a lateral side face of said crankcase, a gear rotatably supported in said housing, a differential mechanism supported by said housing, a gear for driving said differential mechanism supported by said housing in mesh with the first mentioned gear, a support projecting laterally beyond said crankcase, a third gear rotatably supported by said support, means for driving said third gear from said crankshaft, and a transmission mechanism connecting the first mentioned gear with said third gear.

19. In combination, an engine having a crankcase and a crank-shaft therein, a driven shaft positioned in parallel relation with respect to said crank shaft outwardly beyond a lateral side wall of said crank-case, a support fixed to said engine in axially intersecting relation with respect to said shaft, a gear journalled in said support and having a driving connection with said shaft, said shaft being disconnectible from said gear without affecting the journalled relation thereof in said support, and means including a clutch positioned at one end of said engine connecting said crank-shaft and gear for interrelated movements.

ROSCOE C. HOFFMAN.